M. C. CLARK.
MACHINE FOR WORKING CRUDE RUBBER.
APPLICATION FILED MAR. 11, 1907.
960,274.
Patented June 7, 1910.
3 SHEETS—SHEET 3.
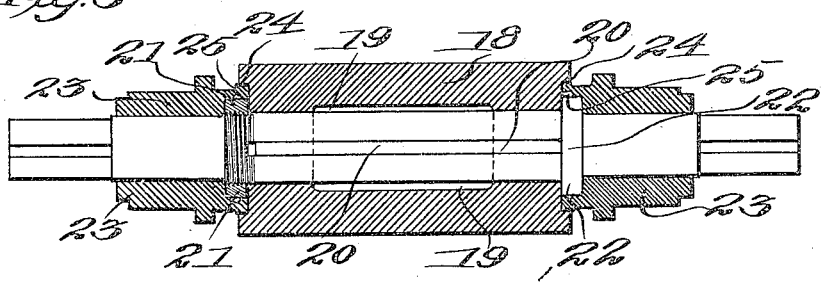
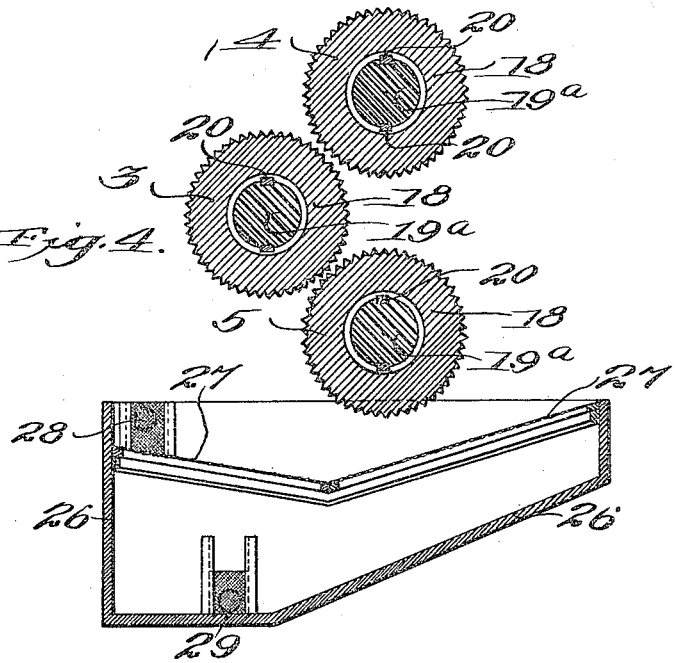
WITNESSES:
INVENTOR
ATTORNEYS

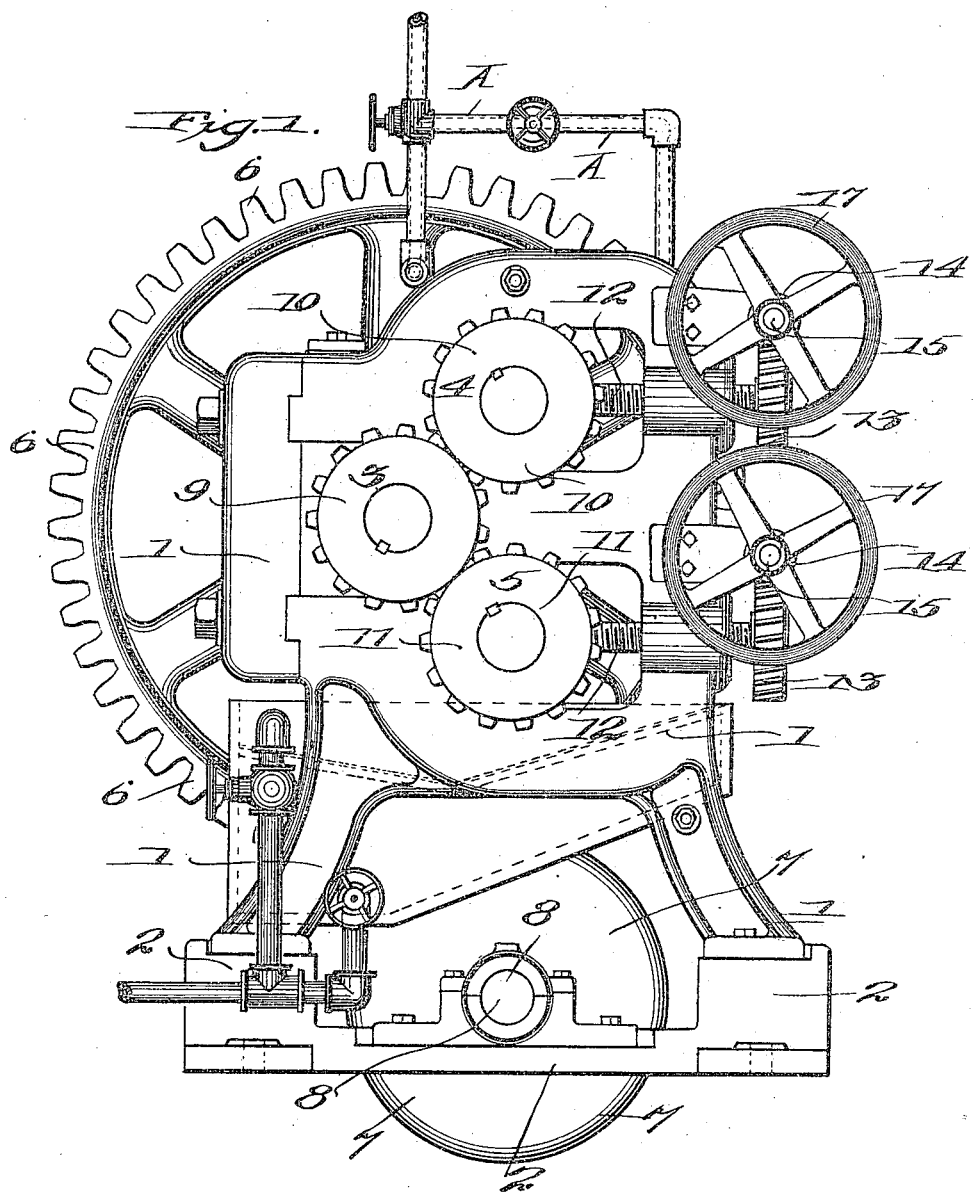

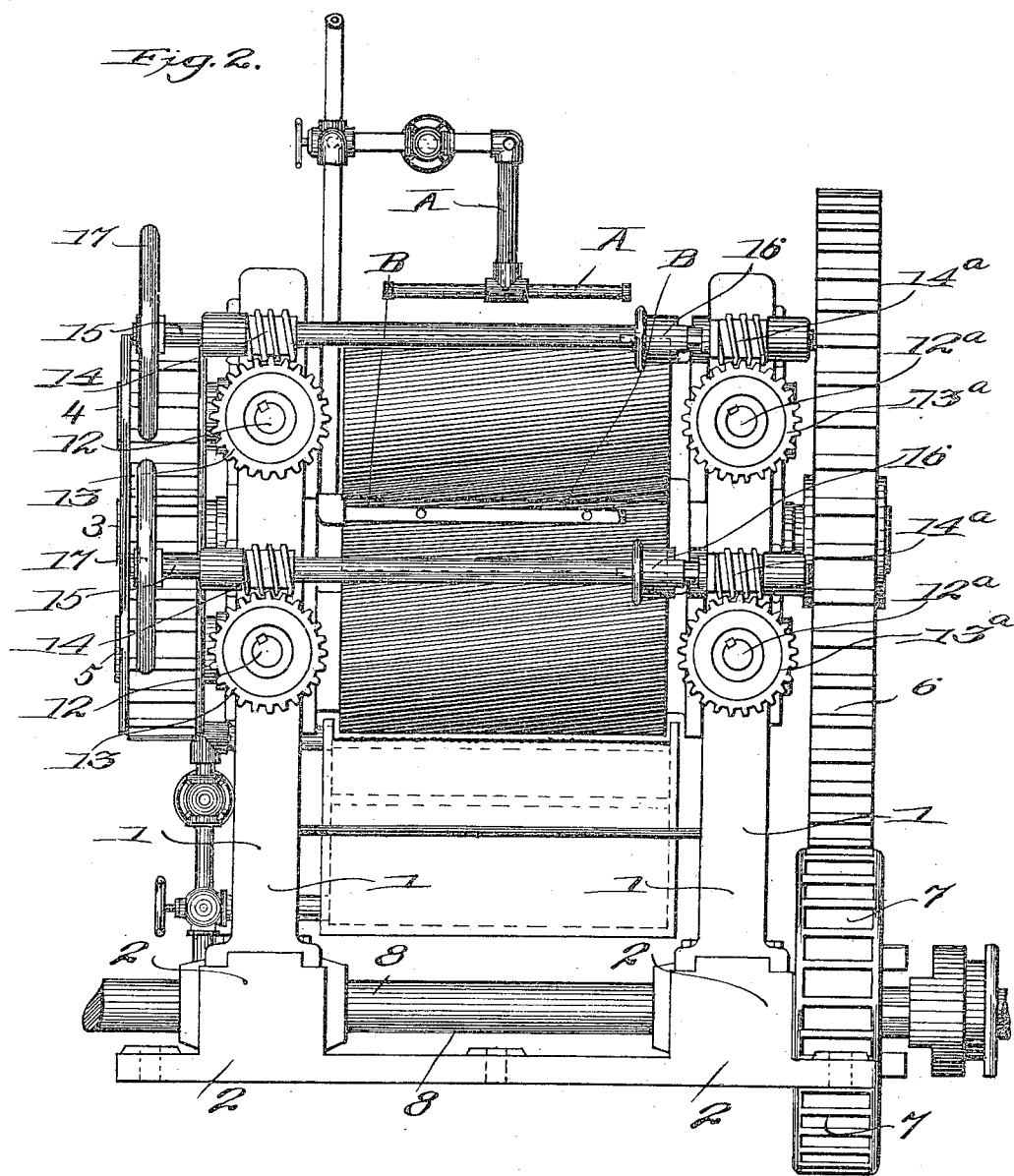

UNITED STATES PATENT OFFICE.

MAURICE C. CLARK, OF PROVIDENCE, RHODE ISLAND, ASSIGNOR TO MAURICE C. CLARK COMPANY, OF PROVIDENCE, RHODE ISLAND, A CORPORATION OF RHODE ISLAND.

MACHINE FOR WORKING CRUDE RUBBER.

960,274.   Specification of Letters Patent.   Patented June 7, 1910.

Application filed March 11, 1907. Serial No. 361,683.

*To all whom it may concern:*

Be it known that I, MAURICE C. CLARK, a citizen of the United States, and a resident of Providence, in the county of Providence and State of Rhode Island, have invented a novel and useful Improvement in Machines for Working Crude Rubber, of which the following is a specification.

The present invention relates to a machine for working crude rubber, such work comprising the operations of washing and sheeting the material, and the present mechanism belongs to the same class and is in the nature of an improvement upon the apparatus shown in my Patent No. 528,498 dated March 12, 1895.

In the machines of the prior art with which I am acquainted, and which are used for the operations for which the present machine is designed, difficulty has been found in adjusting the working rolls so as to secure a product of even thickness at the edges of the sheet. Furthermore, the corrugations of the rolls frequently become badly worn, due to the operator setting one end of the roll very hard together while leaving the opposite ends of the rolls spaced apart, thus causing the corrugations of the ends of the rolls which contact to wear or grind away rapidly, this tending to produce an uneven sheeted product. Furthermore, in machines with which I am acquainted, and as heretofore in use, the rolls have been constructed, each of one body of metal, usually cast iron, having the journals and gear necks turned down and the working portion of the roll corrugated, all being in one casting. When the corrugations have stripped or become worn off it is necessary to take the rolls out of the machine and recorrugate them. This involves a considerable expenditure of time and labor and, furthermore, when the rolls have been recut a few times, they are so reduced in size as to render worthless for further employment and the entire roll must be discarded. It is the purpose of this invention to obviate the objections such as are above recited and a further end to be obtained is a saving in the cost of keeping the machine in working order and the production of a better product.

The invention consists in the construction, combination and arrangement of parts set forth in and falling within the scope of the appended claims.

In the accompanying drawings wherein, by way of illustration, a preferred embodiment of my invention is delineated, Figure 1 is a side elevation of the machine; Fig. 2 is an end elevation thereof; Fig. 3 is a detail view in longitudinal section through one of the rolls with the journal boxes attached thereto; and Fig. 4 is a cross section through the rolls, showing the same in combination with the catch basin and screen.

Referring now to the accompanying drawings in detail, 1, 1 indicate the side frames or housings for holding the rolls, and 2 designates the bed plate for supporting the housings. The main driving roll of the machine is shown at 3, while 4 and 5 indicate the back or adjustable rolls respectively.

6 is the driving gear on the neck of the drive roll 3, driven by the pinion 7 on the driving shaft 8. The drive roll 3 is provided with a gear 9 intermeshing with the gears 10 and 11 on the rolls 4 and 5, respectively. The rolls 4 and 5 are adjusted by means of the screws 12—12, 12ª—12ª, such screws being provided at their outer ends with worm gears 13—13, 13ª—13ª operated by means of the worms 14—14, and 14ª—14ª. The worms 14—14 on the same side of the machine are positively attached to shafts 15—15, while the worms 14ª—14ª on the opposite ends of the shafts 15 are fitted loosely to such shafts and are provided with projecting clutch teeth on the inside ends, which, when engaged by the sliding clutches 16—16, can be revolved to operate the worm gears on the adjusting screws 12ª—12ª. Hand wheels 17—17 are positively attached to the shafts 15—15, for the purpose of imparting motion to the latter. Each of the rolls 3, 4 and 5 is provided with a chamber 19, as is shown in Fig. 3 and such rolls are mounted upon a shaft 19ª and held in position to revolve with said shaft by the feathers 20. The rolls are further held in position against endwise movement by the threaded collar 21 on the shaft 19.

22 indicates a solid collar turned on the shaft 19 and of the same dimensions as the collar 21. Journal boxes 23, 23 are slipped over the ends of the shaft and when the rolls are assembled in the machine are adapted to be held in the housing 1—1. These journal boxes are bored out to fit the journals on the shafts 19 and are also bored so as to cover the collars 21, 22 extending into recesses on each end of the roll, as is shown at 24—24. I also form the journal boxes with chambered grooves 25 to allow for the reception of packing so as to prevent grit, or other foreign particles from entering the journal boxes. A catch basin, as at 26, is provided for collecting the water used in washing the rubber and also for the reception of dirt, or other refuse, coming from the materials being washed. This catch basin is provided with screens 27, 27 set loosely in the catch basin and which screens are provided for the purpose of receiving the rubber while allowing the grit and other foreign matter to pass into the lower part of the basin. The catch basin is provided with an overflow pipe 28 for carrying off the water or other fluid and 29 is a pipe employed for admitting water to the catch basin to flush out and clean the lower part of the same.

In the operation of the machine the rubber is placed between the rolls 3 and 4, while water is sprayed upon the same through the pipe A connected through any suitable piping with a source of water supply. Such rubber then passing down to and between the rolls 3 and 5 while water is sprayed thereon from the pipe B also connected in a suitable manner with the source of water supply. This is clearly shown in Fig. 2. After passing through the rolls the stock falls or drops to the screen 26, the sand, grit, and other particles of foreign matter passing to the bottom of the tank while the rubber is removed from the screen by the operator and repassed through the rolls in the manner above described, as often as may be required to thoroughly clean the same and reduce it to the required thickness of sheet.

Should the operator find the sheeted stock coming thicker at one end of the rolls than at the other, he can remedy this by throwing the clutch 16 out of gear and operating the worm 14 by means of the hand wheel 17 and shaft 15 to place the rolls in an approximately parallel position. Then the clutch 16 may again be thrown into engagement and the rolls are then properly adjusted until the proper thickness of sheeted stock is produced.

By having the rolls made separate from the shafts a set of spare rolls may always be kept at hand at a comparatively small expense ready to replace those worn or damaged, thus requiring but one set of shafts as the latter may be used time and again for the rolls. It will further be noted that but very little time need be employed to remove the threaded collars and drive off the old worn roll and apply the spare roll on the shaft in place of that removed. It will further be evident that I have provided an apparatus embodying and embracing the desired features of simplicity, durability and economy of operation so that a large saving of cost and labor may be had in the operation of a plant for cracking, washing and sheeting rubber. I further wish to be understood that while I have herein shown and described by way of illustration a preferred embodiment of the invention, I do not limit myself to all the precise details shown and described, as modification and variation may be made without departing from the spirit of the invention or exceeding the scope of the claims.

Having thus described my invention, what I claim as new and desire to secure by Letters Patent is:—

1. In a machine of the character described in combination, a plurality of rolls, shafts on which said rolls are feathered, journal boxes for said shafts, a fixed collar on each shaft against which one end of the corresponding roll abuts, and an adjustable collar on each shaft adapted to bear against the other end of the roll, said journal boxes being bored to cover the collars and extending into recesses on the ends of the roll.

2. In a machine of the character described in combination, a plurality of rolls, shafts on which said rolls are feathered, journal boxes for said shafts, a fixed collar on each shaft against which one end of the corresponding roll abuts, and an adjustable collar on each shaft adapted to bear against the other end of the roll, said journal boxes being bored to cover the collars and formed with grooves adapted to receive packing.

3. In a machine of the character described in combination, drive and side rolls, shafts on which said rolls are feathered, journal boxes for said shafts, a fixed collar on each shaft against which one end of the corresponding roll abuts, an adjustable collar on each shaft adapted to bear against the other end of the roll, said journal boxes being bored to cover the collars and extending into recesses on the ends of the roll, and means for maintaining the side rolls in parallelism with the drive roll.

4. In a machine of the class described a frame, a drive roll mounted in the frame, a plurality of side rolls also mounted in the frame and coöperating therewith, means for adjusting the side rolls relative to the drive roll to bring such rolls into working parallelism, a catch basin located beneath the rolls, a screen in said basin upon which the material coming from the rolls is deposited, and means for supplying a washing fluid to the rolls.

In testimony whereof I have hereunto signed by name to this specification in the presence of two subscribing witnesses.

MAURICE C. CLARK.

Witnesses:
RICHARD B. CAVANAGH,
T. E. HARDENBERGH, Jr.